United States Patent Office 3,389,842
Patented June 25, 1968

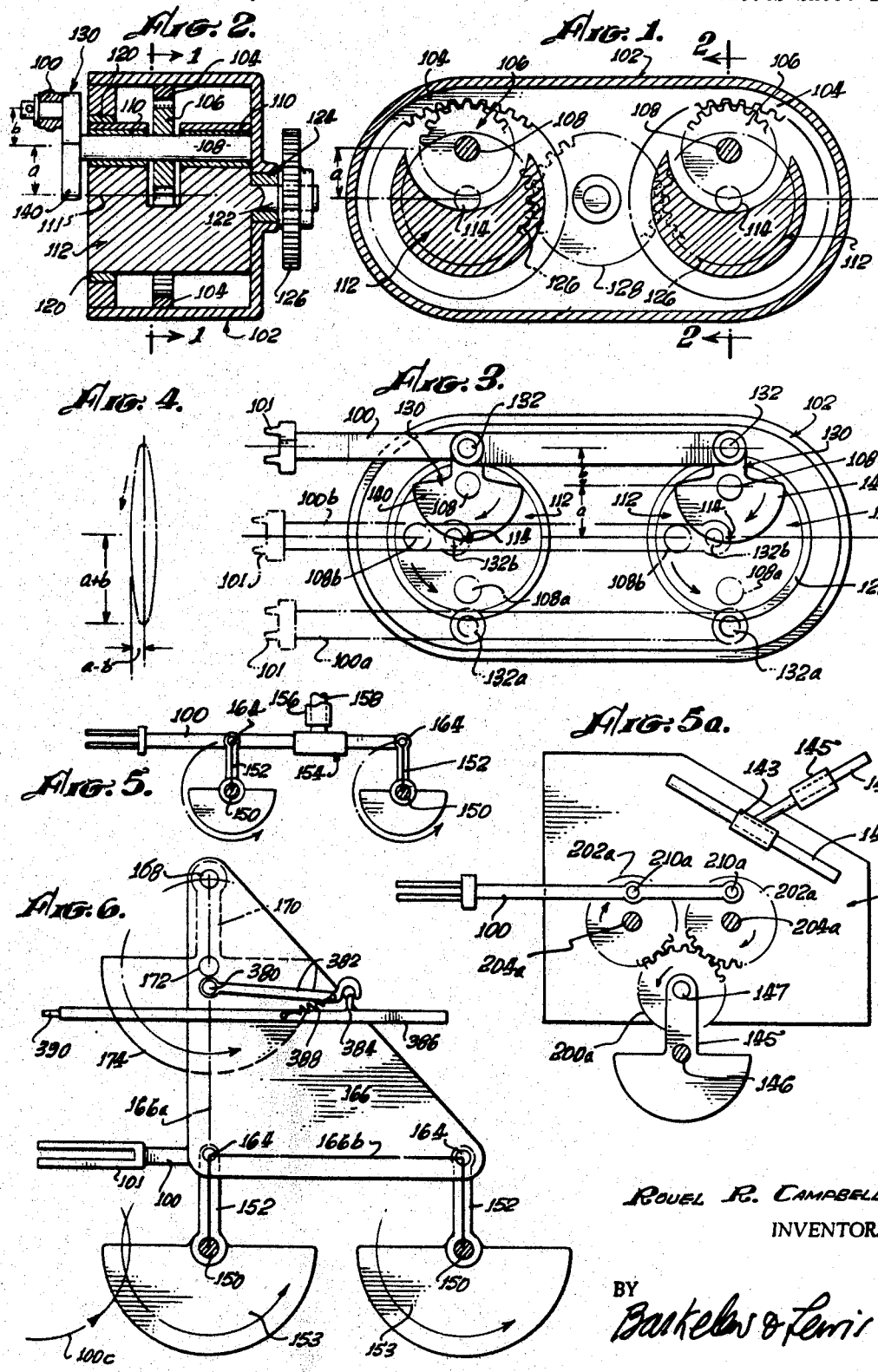

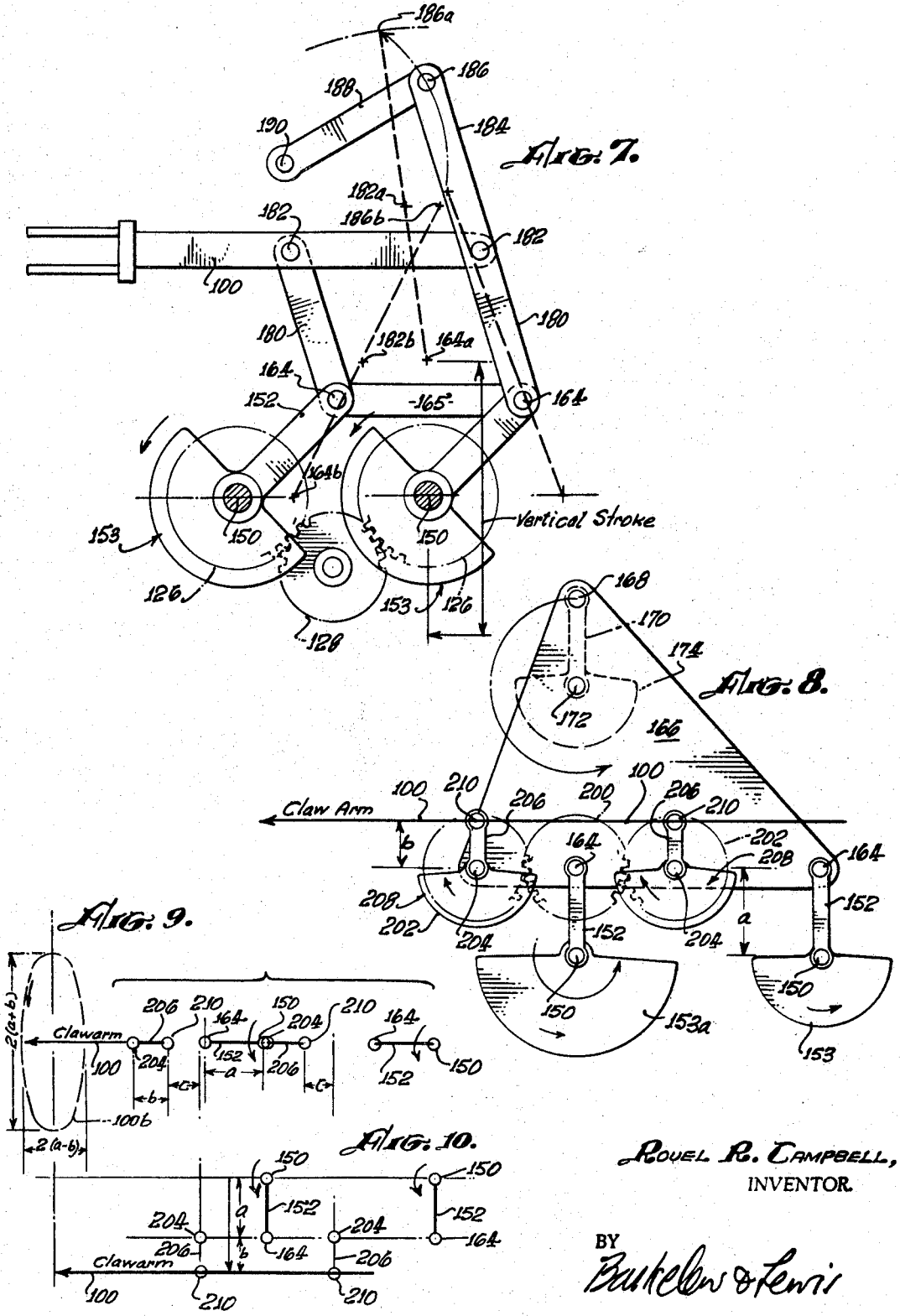

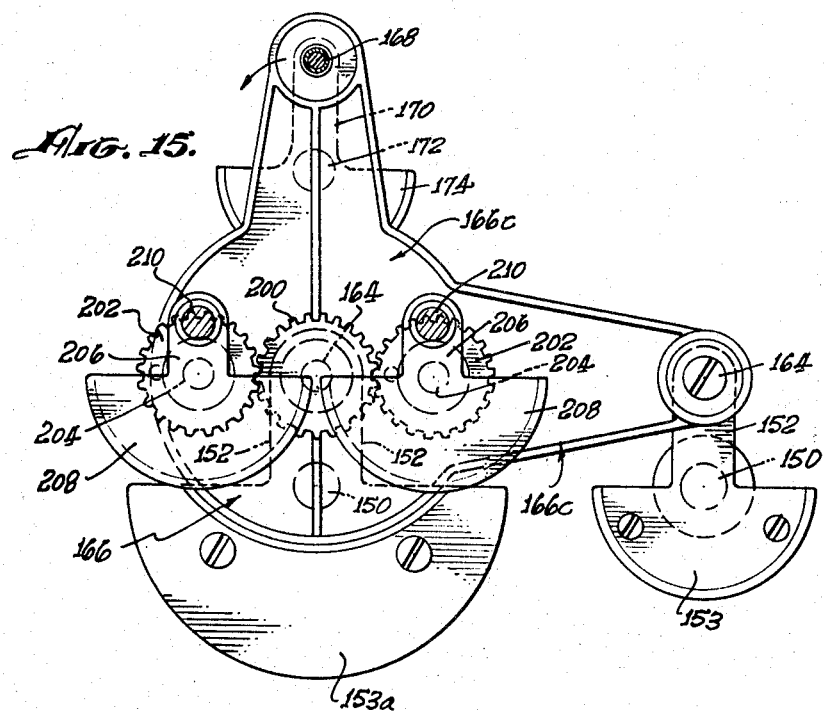
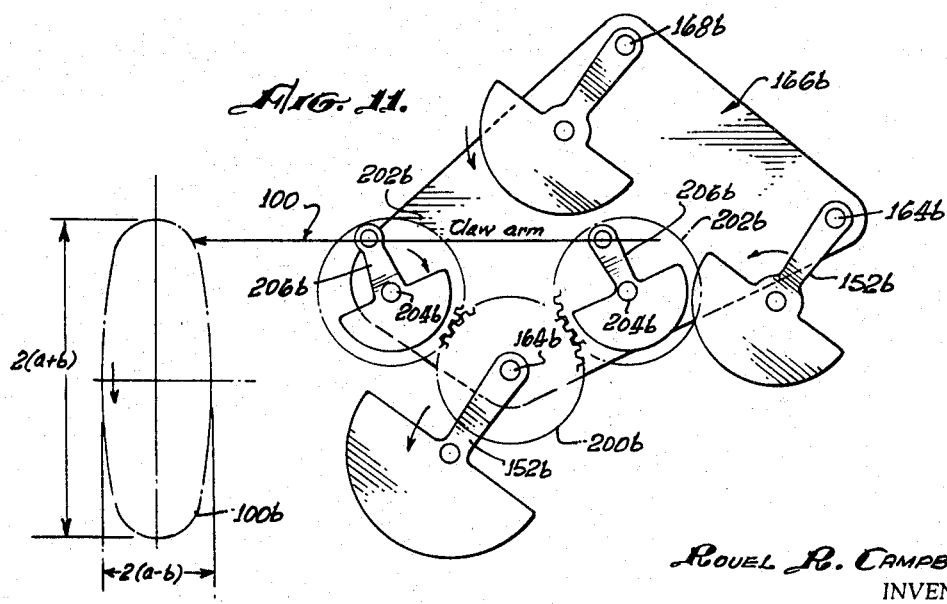

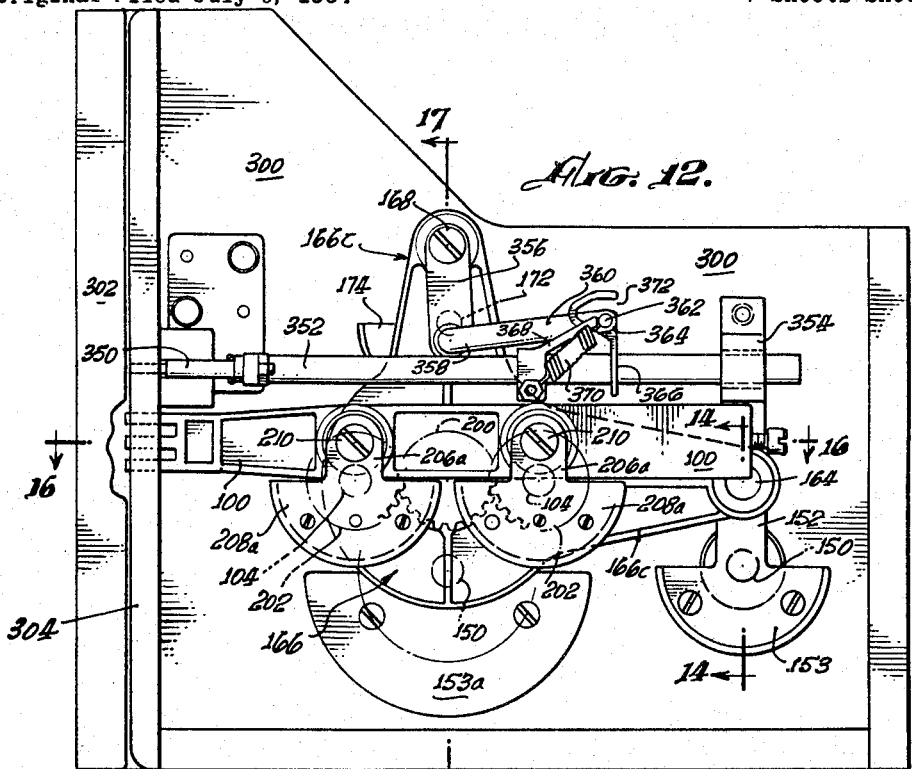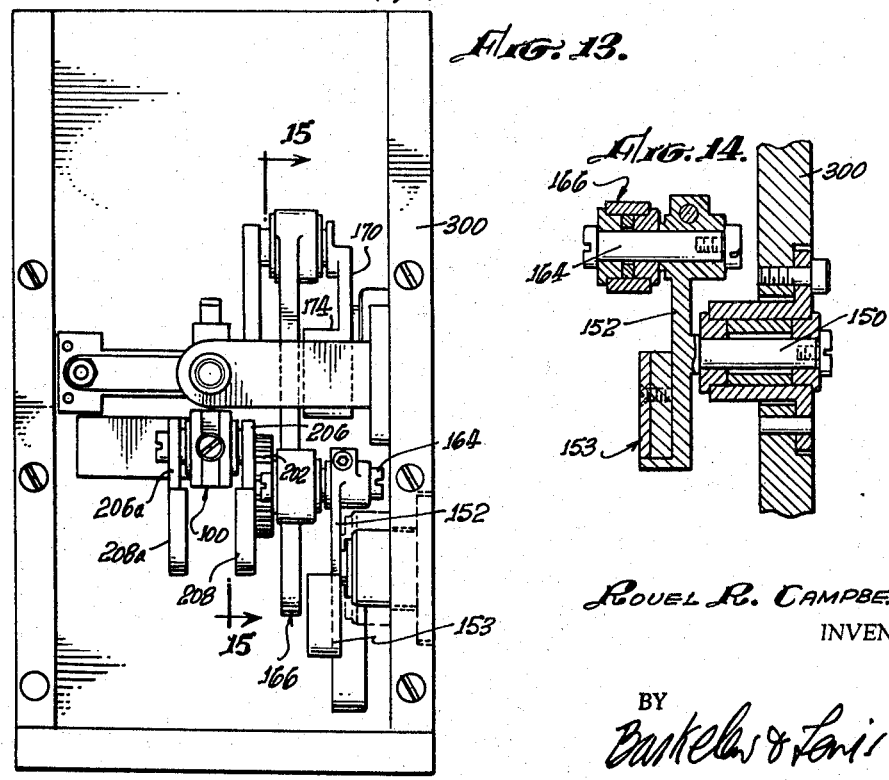
Roquel R. Campbell,
INVENTOR.

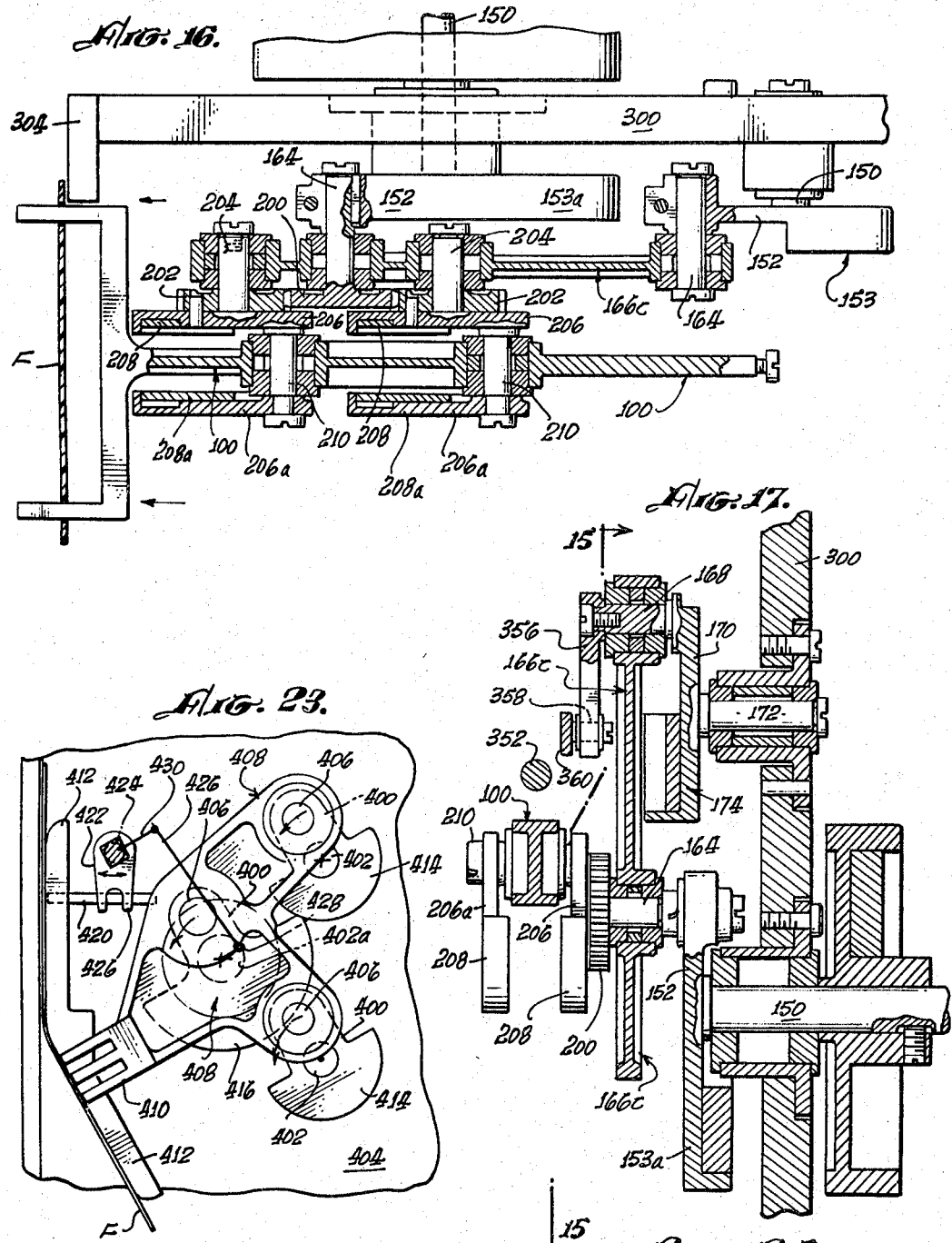

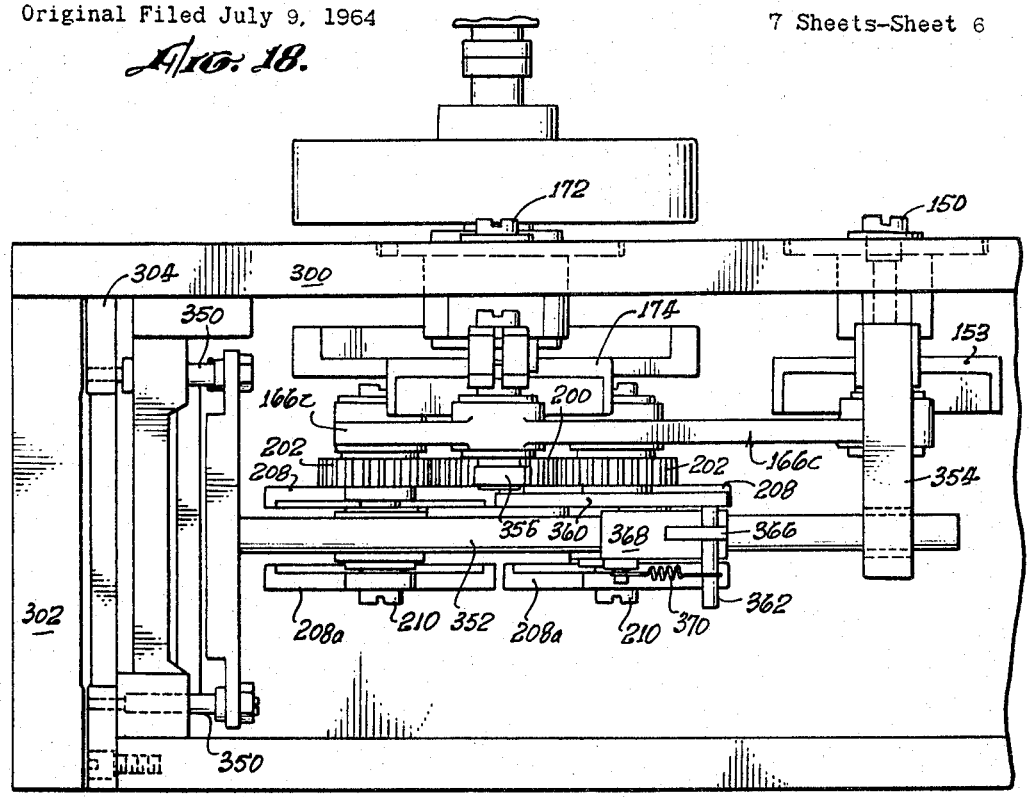
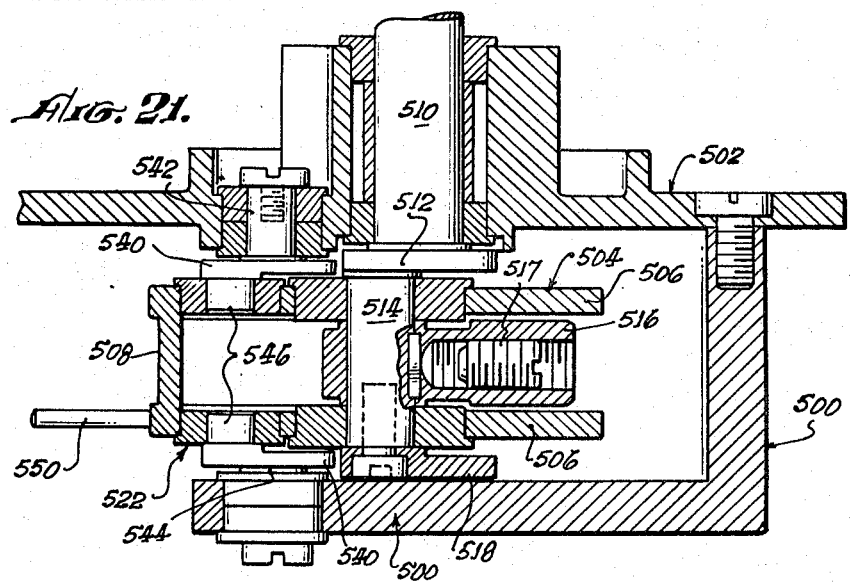

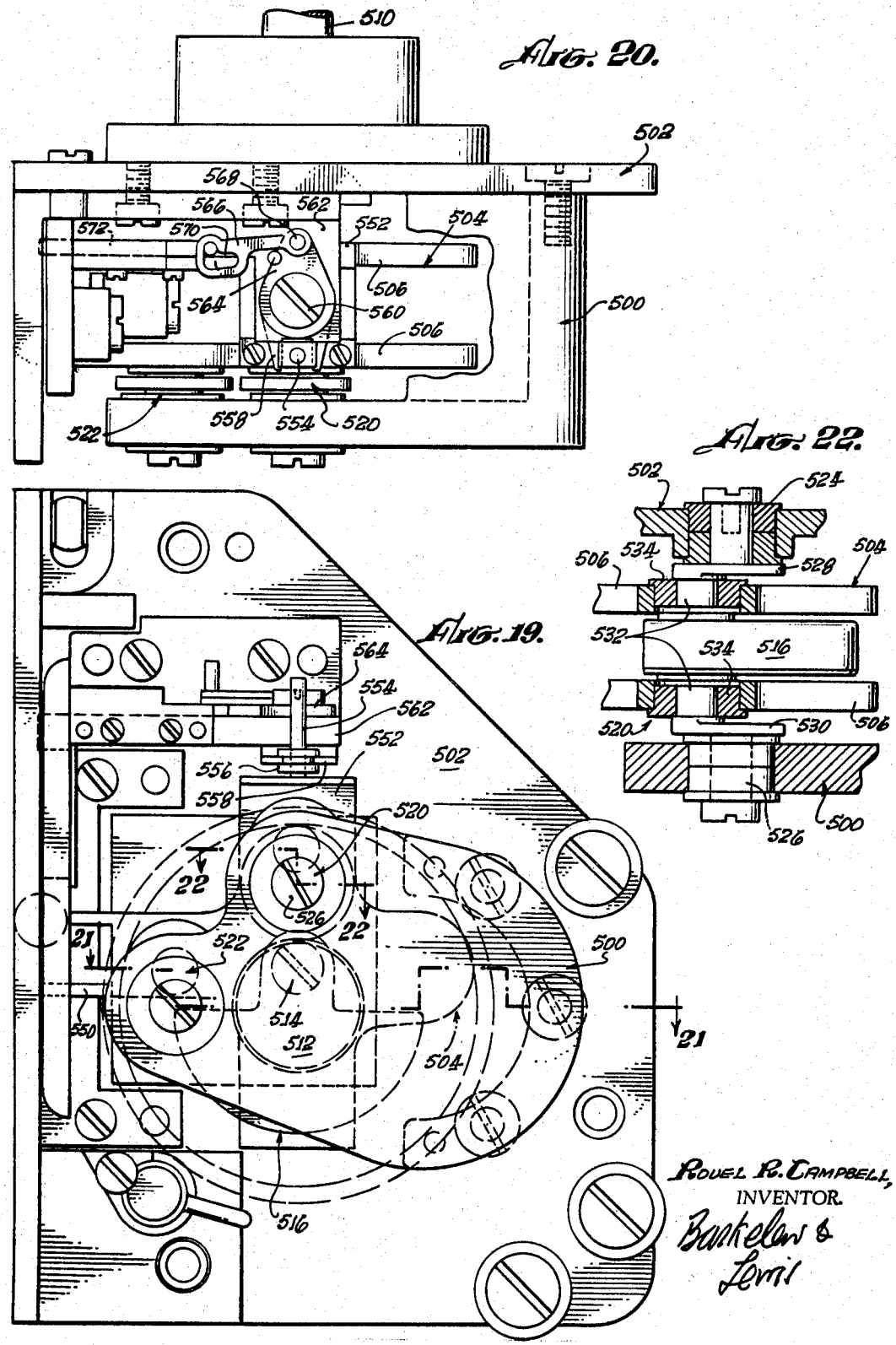

3,389,842
KINETOGRAPH MOVEMENT MECHANISM
Rouel R. Campbell, Los Angeles, Calif., assignor to Mitchell Camera Corporation, Glendale, Calif., a corporation of Delaware
Continuation of application Ser. No. 381,295, July 9, 1964. This application Mar. 1, 1967, Ser. No. 619,872
22 Claims. (Cl. 226—69)

ABSTRACT OF THE DISCLOSURE

A film engaging claw is carried by a member mounted on a pair of crank members rotating in a given direction, the crank members being mounted on means rotating in the opposite direction, the resulting motion of the claw carrying member being the sum of the two motions.

---

This application is a continuation of application Ser. No. 381,295, filed July 9, 1964, now abandoned.

One general characteristic of the movement mechanism of the present invention is the provision of a claw arm movement such that, throughout the closed path of the film engaging claws, the claw arm positions are in mutual parallelism. That is, the claw arm moves through positions parallel to itself.

In the commonly used type of movement mechanisms, the claw arm swings about a pivotal axis at its rear end opposite its end carrying the film engaging claw or claws. That pivotal axis may be fixed, with the claw arm sliding on it for its in-and-out film engaging and disengaging movement, or the pivotal axis may be carried by the claw arm and slide relative to the kinetograph frame. In either case the major film moving stroke involves claw arm swinging about that axis. Efforts have been made to kinetically balance such a swinging claw arm to allow the mechanism to be operated at high speed with minimum vibration. But such efforts have either been fruitless or involve complicated mechanisms, such for instance as a kinetically duplicate claw arm driven oppositely.

The parallel claw arm movement of the present invention lends itself highly to simple balancing of the whole movement mechanism for relatively vibrationless high speed operation, as will appear from the following descriptions of typical and illustrative claw moving mechanisms. In the following descriptions several different illustrative claw moving mechanisms with their appropriate balances are set out; and the invention itself will be best gathered and understood from the descriptions of those several typical mechanisms.

The several typical mechanisms are shown in the accompanying drawings in which:

FIG. 1 is a more or less schematic sectional elevation taken on line 1—1 of FIG. 2 and showing one illustrative form typical of the invention;

FIG. 2 is a section on line 2—2 of FIG. 1;

FIG. 3 is an elevation in the aspect of FIG. 1;

FIG. 4 is a diagram illustrating the type of claw and claw arm movement of the mechanism of FIGS. 1 to 3; FIGS. 1 to 4 showing a mechanism of the type utilizing planetary gearing;

FIG. 5 is a schematic illustrating another typical form of mechanism utilizing crank drive means;

FIG. 5a shows certain variations of the form shown in FIG. 5;

FIG. 6 is a schematic illustrating another typical form utilizing what is here referred to as the three-crank stabilizing drive;

FIG. 7 is a schematic showing a variation of the types of FIGS. 5 and 6;

FIGS. 8 to 10 are schematics showing another illustrative and typical form in which the three-crank means of FIG. 6 and the planetary means of FIG. 1 are utilized; FIG. 8 showing the parts in their position at the top of the claw stroke, and FIGS. 9 and 10 showing the parts at 90° rotation in the middle of the down stroke, and at 180° rotation at the bottom of the down stroke; and FIGS. 8 to 10 schematically showing the typical developed mechanism of FIGS. 12 to 18;

FIG. 11 is a schematic showing a variation of FIG. 8;

FIG. 12 is an elevation of a preferred development of the form shown schematically in FIGS. 8 to 11; FIG. 12 showing the parts in the top of stroke position of FIG. 8;

FIG. 13 is an end view in the aspect indicated at 13 in FIG. 12;

FIG. 14 is a vertical section on line 14—14 of FIG. 12;

FIG. 15 is a vertical section on lines 15—15 of FIGS. 13 and 16, being in the same aspect as that of FIG. 12;

FIG. 16 is a horizontal section on line 16—16 of FIG. 12, but showing the parts in the position shown in FIG. 9, rotated 90° from the positions of FIGS. 8 and 12;

FIG. 17 is a vertical section on line 17—17 of FIG. 12;

FIG. 18 is a plan of the mechanism of FIG. 12; FIGS. 14 to 18 are at full scale for 70 mm. film, FIGS. 12 and 13 at somewhat reduced scale;

FIG. 19 is an elevation of another developed form of movement mechanism employing the three-crank drive and stabilization;

FIG. 20 is a plan of the mechanism of FIG. 19;

FIGS. 21 and 22 are horizontal sections on line 21—21 and 22—22 of FIG. 19, these FIGURES 21 and 22 showing the cranks rotated 90° from the positions of FIGS. 19 and 20; and FIG. 23 is an elevation showing another developed form of the three-crank type.

FIGS. 1, 2 and 3 illustrate, more or less schematically, a type of planetary movement mechanism in which the claw arm 100 is moved, parallel to itself, through a movement path generally elliptical with a relatively small minor axis in the in-and-out direction of claw movement. In those figures a suitable frame or casing is indicated at 102, the casing carrying two spaced stationary internally toothed ring gears 104 each engaged by planetary pinions 106 mounted on shafts 108 carried in suitable bearings 110 in carriers 112 that are rotatable in the casing about axes 114 parallel to the axes of shafts 108 and the gearing and concentric with ring gears 104. The radial spacing of axes 114 from the axes of shafts 108 is designated $a$ in the figures. Carriers 112 may be mounted for rotation about axes 114 in the casing in any suitable manner. They are here shown simply mounted at one end in bearings 120 and at their opposite ends on shafts 122 carried in bearings 124. Shafts 122 carry gears 126 of equal size and those two gears and their carriers 112 are driven at equal angular speeds in the same direction by an interposed driving gear 128. As will appear, the pitch diameters of planetary pinions 106 are half that of ring gears 104, the latter being of equal pitch diameters.

Counter-balanced cranks 130 are mounted on the ends of planetary shafts 108, and their crank pins 132, at equal radial distances from the axes of shafts 108, carry the claw arm 100. That radial distance is denoted $b$ in the figures. Dimension $b$ is unequal to dimension $a$, here shown as slightly less than $a$. Counterbalances 140 balance both the cranks and the mass of the claw arm.

Assume rotation of carriers 112 in the direction indicated. Planetaries 106 rotate about their shaft axes in the opposite direction while those planetary shafts are carried about the main carrier axis 114 in the direction of carrier rotation. It results that with relation to the casing satellite shaft 108 and their cranks 130 rotate at the same angular speed as that of the carriers, e.g., when planetary shafts 108 have reached the position shown in broken lines in FIG. 3 at 108a diametrically opposite the position of 108 shown in full lines, crank pins 132 will reach the positions shown at 132a, carrying claw arm 100 from the position shown in full lines to the position shown at 100a. The vertical stroke of the claw arm is thus twice the dimension a+b.

When planetary shafts 108 reach the positions indicated at 108b, by 90° rotation from the full line position, then crank pins 132 reach the positions indicated at 132b. In that position their axes are to the left of carrier axes 114 by a distance equal to a−b. The half minor diameter of the path of claws 101 is consequently a−b, while the half major diameter is a+b, as indicated in FIG. 4. If b is made greater than a the minor half diameter would be b−a, and it would only be necessary, to get the same direction in the path of claw movement, to operate the mechanism in the rotational direction opposite to that shown.

Kinetic balance of the form shown in FIGS. 1–4 is mainly by the balance masses 140 on the cranks 130, which balance both the cranks and the claw arm 100. Rotating carrier 112 and its carried parts is either in balance as shown or may be balanced, say, by lightening the carrier parts opposite planetary gears 106.

FIG. 5 shows schematically a form in which the parallel relationship of the claw arm 100 to itself is maintained without the necessity of gearing. Here two fixed axis shafts 150 have equal throw crank arms 152 carrying claw arm 100 at crank pins 164 at their outer ends. Interconnection of the two shafts 150 by gearing such as shown at 126, 128 in FIG. 1 would co-relate the crank arms to have no dead center and to maintain them at the same orientation and equal angular displacement from the positions shown. But the two-directional slide guide at 154, 156 maintains claw arm 100 always in self-parallelism without any gearing. The claw arm 100 slides through 154 which is mounted on a supporting rod 158 sliding through fixed guide 156. Here again the whole movement mechanism may be balanced by counter-weights 153 shown as carried by cranks 152. Maintaining the claw arm in parallelism with itself maintains the cranks 152 in the same orientations and eliminates any dead center.

With regard to the driving and stabilization system of FIG. 5 it is remarked that the two slides are not necessarily at right angles to each other, nor either in line with the in and out throw of claw arm 100. FIG. 5a schematically illustrates such variations; also the fact that, utilizing a stabilizing system involving two slides, only a single driving crank is necessary. And FIG. 5a also shows how the differential drive of FIGS. 1 etc. may be incorporated with such a crank drive.

In FIG. 5a a carrier plate 141 is guided in its movements to always be parallel with itself by a slide member 142 on the plate sliding through a guide 143 carried by a rod 144 sliding through a fixed guide, with rod 144 at an acute angle to 142. A single crank 145 rotating on the fixed axis of crank shaft 146 has a crank pin 147 carrying plate 141. Assume first that claw arm 100 is carried directly by plate 141, in which circumstances its claw will describe a circular movement path, as in FIG. 5.

But if claw arm 100 is carried by pins 210a affixed to planetary gears 202a rotatably mounted at 204a on plate 141 and meshing with an equal pitched gear 200a mounted on crank pin 147 and fixed to the crank 145, the circular path of the claw will be modified as is later explained in connection with FIGS. 8, etc.

FIG. 6 shows a preferred simple arrangement for paralleling the claw arm movement without the necessity of gearing. Here, as in FIG. 5, two fixed axis shafts 150 carry equal crank arms 152 which, at their outer crank pins 164, carry a member which will here be called a plate 166. At a third crank pin 168, not in alignment with crank pins 164, a third crank 170 on a fixed axis shaft 172, also carries the plate 166. With the three cranks of equal radial lengths and in mutual parallel orientation the plate carrier claw arm 100 is always maintained parallel to itself. Initial drive may be applied to any crank shaft 150 or 172, initial drive of only one being necessary. That initial drive rotates the other two cranks in mutual orientation and without any dead center. In this form, as also in FIG. 5, counter balance masses 153 and 174 carried by the cranks opposite their crank pins 164, 168 balance all the moving parts. The path of plate 166 and its carried claw arm 100 and also of that claw arm in FIG. 5 is, here, circular as indicated at 100c. That circular movement necessitates long film engaging claws, such as shown in some of the structural drawings later referred to. Under certain conditions the film sawing action of such claw movement is not objectionable, and the simplicity of such a design as in FIG. 6, involving no gearing, is desirable. Other arrangements, such as those shown in schematic figures such as FIGS. 7, 8 and 9–11, reduce film sawing to a minimum either without any gearing or a minimum of gearing.

It may be remarked that, in any such form as in FIGS. 5 or 6, where the claw arm is carried on a plurality of crank pins, it may not be necessary to counterbalance each crank. It is desirable to do so in order to balance each crank mass directly without putting an interconnecting part (e.g., claw arm 100 in FIG. 5 or plate 166 in FIG. 6) under stress. Particularly in the form involving a rigid plate such as 166 in FIG. 6 a single counterbalance mass on one crank might suffice. These same remarks apply to the form of e.g., FIG. 8 where the claw arm is carried on a plate driven and stabilized on three cranks.

In such a form as in FIG. 6 where the path of carrier plate 166 is circular the geometric inter-relations of the lines indicated at 166a and 166b (along which support points 164 and 168 are spaced), and the relations of those spacing lines to the direction of projection of claw arm 100 or the claws 101 from the carrier plate 166, are immaterial. It is only necessary that the three suspension points 164, 164 and 168 be non-alined and that the three cranks have equal throws and are in the same orientation about their axes of rotation. Those facts are illustrated in schematic FIG. 11 and in certain developed forms described below; see e.g., FIGS. 19 to 22.

In any form utilizing three cranks for driving and stabilization there may be more than three equal throw and oriented cranks, just so long as three of them are out of mutual alinement. Only three, however, are necessary. And, although it is then sufficient to initially drive just one of the cranks, more than one can be initially driven. But in that circumstance, gearing would be necessary to drive two or more cranks in synchronism; and it is one of the advantages of the described crank movement that it eliminates entirely the necessity of any gearing.

FIG. 7 schematically shows a parallelogram linkage for driving and stabilizing the claw arm 100 in parallelism to itself coupled with further means for controllably reducing the claw movement through the film. In this figure two equal length cranks 152 are carried on fixed axis shafts 150 and at their crank pins 164 carry two equal length links 180 whose other ends carry claw arm 100 at pivotal points 182. With cranks 152 in parallelism and in the same orientation pivotal points 182 are spaced apart equal to the spacing of crank pins 164.

One of the links 180 is extended at 184 beyond 182 and at 186 is pivotally connected to one end of an arm 188, whose other end is fixedly pivoted at 190. In this form involving parallelogram linkages, cranks 152 may be kept in the same parallel orientation about their shafts 150, either by gearing 126, 128 as in FIG. 1, and/or by a linkage connection between the two crank pins 164, as shown at 165.

Assuming rotation of cranks 152 in the direction indicated, with the right hand crank pin 164, say, at its topmost point 164a, pivotal point 186 has swung to the point designated 186a and 182 is then at 182a. In the furthest left hand position of 164, on its way down, indicated at 164b, then 186 has swung down to 186b and 182 is at 182b. The total horizontal movement of the claw arm 100 on its path down is indicated by the horizontal distance between positions 182a and 182b. The amount of that horizontal movement may be very much varied, and reduced, by varying the paramenters of the illustrated system; so that the claws on the claw arm need not be very long and film sawing reduced. Counter balances 153 on shafts 150 here balance the whole moving mechanism as the counter balance masses do in FIGS. 5 and 6. Either link 180 may be extended to and carry the guided point 186. Guiding that point guides the link points 182, and guide arm 188 may be connected directly to one of the 182's.

FIGS. 8, 9 and 10 illustrate schematically a form of claw moving and stabilizing mechanism that embodies both the three crank suspension of FIG. 6 and the planetary gearing control of FIGS. 1–3, but with a much simplified gearing train involving fewer gears. The form shown schematically in FIGS. 8 to 10 is shown in a typical fully designed form in FIGS. 12 and following, so this description of FIGS. 8 to 10 is a preliminary simplified description of the developed form of FIGS. 12 etc.

In FIG. 8 claw arm carrier plate 166 and cranks 152 and 170 with their counter balances 153 and 174 are schematically shown as the same or similar to those parts in FIG. 6. As in FIG. 6 the three equal-throw cranks in the same mutual orientation maintain plate 166 in parallelism with itself throughout the rotation of the cranks; and the counterbalances 153, 174 balance the cranks and the plate with the plate carried parts.

One of the cranks, e.g., the left one 152 carries on the axis of its crank pin 164 a gear 200 fixed with relation to the pin and crank so that, in one revolution of the crank about its fixed axis shaft 150 gear 200 makes one revolution in the same direction with relation to plate 166. Counter balance mass 153a is shown as larger than 153, 174, to additionally balance gear 200 carried on that left-hand crank 152.

Two planetary gears 202 of the same pitch diameter as gear 200 are mounted fixedly on shafts 204 journalled in or on plate 166 and mesh with gear 200. Assuming rotation of cranks 152, 170 and gear 200 in the direction indicated, the two planetary gears rotate, at the same angular speed as 200, in the opposite direction with reference to plate 166. Shafts 204, rotating with gears 202 carry cranks 206 in parallelism and in the same orientation and each gear shaft-crank unit carries a counterbalance 208 radially opposite the cranks. Crank pins 210, at equal distances from crank shafts 204, carry the claw arm 100, here indicated as a single pointed line. Counterbalances 153, 153a and 174 kinetically balance the movements of their cranks, gear 200, plate 166 and the masses of the parts carried by the plate, including the masses of gears 202, cranks 206, counterbalances 208 and claw arm 100. Counterbalances 208 kinetically balance the rotational movements of cranks 206 and their carried claw arm 100 with reference to plate 166. As here shown, the radial lengths of cranks 206, designated b in FIGS. 8–10, is less than the radial lengths of cranks 152, 170, designated a. As in FIG. 6, initial rotary drive may be applied to any of the plate-carrying cranks.

Assume rotation of the plate carrying cranks 152, 170 in the direction indicated. That rotation, from the position shown in FIG. 8 through the position indicated schematically in FIG. 9 to that of FIG. 10 carries claw arm 100 down. On 90° rotation to the position of FIG. 9, cranks 152 have with their crank pins 164 reached the positions indicated, to the left of their positions of FIG. 8. Crank shafts 204 have moved to the left by the same distance to the positions indicated, and cranks 206, now extending to the right, place the claw carrying crank pins 210 in a position to the left of the position of FIG. 8 by a dimension $c = a - b$.

On 180° rotation of cranks 152 cranks 206 extend downwardly from crank shafts 204 (FIG. 10), so the distance of the claw carrying crank pins 210 below the level of crank shafts 150 is equal to $a + b$. The half minor diameter of the claw path indicated in FIG. 9 is therefore $a - b$; while the half major diameter is $a + b$. By varying the relation between $a$ and $b$ the claw path may be made to have as small a minor diameter as desired.

As shown here the throw of cranks 206 is less than that of cranks 152, 170. It is only necessary, to obtain a claw path like that of FIG. 9, that the throws be unequal.

It will also be observed that in this form of FIG. 8, the path of carrier plate 166, like that of the plate in FIGS. 5 and 6, is circular. It is consequently immaterial what the geometric relationship may be between the three points 164, 164 and 168 at which plate 166 is supported and driven, provided those three points are not in alinement. And it is also immaterial that either or both support points 164 be in any alinement with the crank shafts 204. The schematic of FIG. 11 illustrates those observations.

In FIG. 11 plate 166b is shown supported on the crank pins arranged in a geometric pattern different from that of FIG. 8 and with none of those support points in alinement with shafts 204b of the claw carrying cranks 206b. Gear 200b carried on the left hand crank 152b is centered on that crank pin 164b out of alinement with the axes of 204b, and meshes with gears 202b of the same pitch diameter. The indicated relative directions of rotation are the same as in FIG. 8. In the illustrated crank positions the claw on arm 100 is nearing the end of its upstroke. As in FIGS. 8–10 it is only necessary, in order to relate the claw path 100b to the movement of the claw arm 100 as illustrated, to so relate the rotation of the plate carrying cranks to the rotation of the claw carrying cranks that their crank pins reach, in the relative positions shown in the figures, their uppermost or lowermost positions at the same time. In these schematics it is assumed that the film moving claw stroke is, generally, vertical.

FIGS. 12 to 18 show a preferred developed form of the mechanism shown schematically in FIGS. 8 to 11. In FIGS. 12 to 18 a plate 166c is carried as in FIG. 8 on the three crank pins 164, 168 of the three cranks 152, 170 carried on crank shafts 150, 172; cranks 152 carrying the counterbalance masses 153 and 153a and crank 170 the counterbalance mass 174. Gear 200 is carrier fixedly on left-hand crank 152 at its crank pin 164 and meshes with the two planetary gears 202 of the same pitch diameter mounted on shafts 204 journalled on plate 166c. Shafts 204 carry cranks 206 counterbalanced at 208 and their crank pins 210 cary claw arm 100. The schematic arrangement is the same as in FIG. 8 as may best in seen by reference to FIGS. 12 and 15.

The figures show a mounting plate 300, an aperture plate 302 and a film gate plate 304. FIG. 17 shows the upper crank shaft 172 journalled on mounting plate 300 and the left hand lower crank shaft 150 also journalled on that plate. FIG. 14 shows the right hand crank shaft 150 also journalled on that plate 300. As in FIG. 8, initial drive may be to any of the crank shafts 150, 172, but is preferably to the lower left-hand shaft 150 whose crank 152 carries the central gear 200. That drive is shown in FIGS. 16 and 17.

In the developed design counterweights 208 are double with one on each side of claw arm 100. As is best shown in FIGS. 13 and 16, the crank arms 206 carrying crank pins 210 and counterweights 208 are directly mounted on and carried by cranks 206 on crank shafts 204 that carry the planetary gears 202. Duplicates of those cranks and counterweights are rigidly mounted on the crank pins 210 at the side of claw arm 100 opposite cranks 206. Those duplicate dummy cranks and counterweights are designated 206a and 208a. This distribution of the counterbalance masses at opposite sides of claw arm 100 minimizes claw arm twisting about its central longitudinal axis.

FIGS. 12 and 17 show a film register or pilot pin design applied to the three crank form of suspension and drive. Pilot pin or pins 350 project and slide through film guide 304, mounted on the forward end of sliding register shaft 352 whose rear end slides in a guide 354 attached to mounting plate 300. As shown in those figures an arm 356 is rigidly attached to the end of crank pin 168, that pin being rigid with the upper crank 170. Arm 356 extends from pin 168 in a direction parallel to crank 170 and, as best seen in FIGS. 12 and 17 it carries at its end a pivot 358 on an axis that lies just beyond the axis of crank shaft 172. In the positions shown in FIGS. 12 and 17 the axis of pivot 358 lies a short distance below the axis of 172. Crank 170 rotates pivot 358 diametrically opposite crank pin 168 at a short radius about the axis of 172. When crank 170 rotates in the direction indicated to move plate 166c and its carried claw arm back and forth, pivot 358, carried by the crank, moves oppositely to the plate and claw arm.

A link 360 extends rearwardly from pivot 358 and at its rear end carries a cross rod 362 (FIG. 18) which normally nests between a shoulder 364, on a member 366 attached to shaft 352, and the rear end of a member 368 also attached to that shaft. A spring 370 pulls cross rod 362 down to position between the shoulder 364 and the end of that member. In that normal position of shaft 362 shaft 352 and the pilot pins 350 move back and forth with the crank-carried pivot 358. To release the pilot 350 from the film, cross bar 362 is raised from its nest and out through opening 372 in member 366, and then when 362 is raised above 366 spring 370, attached to shaft 352, pulls it and the pilot pins back out of the film.

The same type of pilot pin actuation may also be applied to any of the other forms using supporting and driving cranks. Its application is, e.g., shown schematically applied to the form shown schematically in FIG. 6. In that figure a pivot pin 380 is shown carried by crank 170 a small distance below the axis of crank shaft 172. A link 382 extends from that pivot pin and at its end hooks over a lug 384 on the sliding pilot shaft 386, held down normally by a spring 388 attached at its ends to 382 and shaft 386. On lifting 382 the spring pulls pilot shaft 386 and pilot pin 390 back and out of the film.

FIGS. 19 to 22 show another developed form in which the three-crank drive and suspension is used. In these figures an enclosing casing 500 is attached to mounting plate 502, and the three-crank driven plate 504 made up of two spaced plate members 506 integrally interconnected at 508. Drive shaft 510 journalled on mounting plate 502 carries a crank 512 with a crank pin 514 which extends through both plate members 506 and is journalled in those members. Between the two spaced plate members the crank pin 514 carries a counterweight 516 fixed on the pin radially opposite the throw of crank 512; and the outer end of the crank pin 514 carries another counterweight 518 similarly oriented. The screw 517 in counterweight 516 is adjustable for fine balance adjustment.

The other two stabilizing cranks include the crank device 520 located above driving crank 512 and the third crank device 522 located at the level of the driving crank 512 (FIG. 19). Crank device 520 (FIG. 22) has two crank shafts 524, 526 journalled in mounting plate 502 and in housing 500. These crank shafts carry cranks 528, 530 in similar orientation with crank pins 532. These crank pins are journalled in both plate members 506 and end flush with their journals 534 to allow counterweight 516 to spin between them.

The third crank device 522 is composed of two non-connected cranks 540 on shafts 542, 544, journalled in mounting plate 502 and housing 500. Their crank pins 546, in the same orientation as that of the other two cranks, are journalled in the two plate members 506. Counterweight 516 also spins between the two pins 546. The two crank systems 520, 522 are identical.

All the cranks are of equal throw, as in FIG. 6, and the resulting path of claw arm 550, carried by the plate members, is circular as in FIG. 6.

An upper extension 552 of the plate members carries a vertical pin 554 that is vertically slidable through a member 556 held between two arms of a member 558 that is pivoted on vertical pivot 560 mounted to swing in a bracket 562 attached to mounting plate 502. An arm 564 extends from pivot 560 opposite the extent of member 558, and a link 566 is pivotally connected at 568 to the outer end of arm 564. Link 566 detachably connects at 570 with pilot pin 572. The pilot pin is thus driven oppositely in horizontal direction to the claw arm 550.

FIG. 23 shows another typical developed design of the general three crank type of FIG. 6. Here three cranks 400 are mounted on shafts 402 that are journalled on mounting plate 404. Their crank pins 406 carry the claw member 408 that has the film engaging claws 410. Film F is shown guided in a film race 412. The three cranks 400, or their crank shafts 402 carry the balancing counterweights 414 and 416. The claw movement here, as in FIG. 6, is on a circular path of radius equal to the equal throws of the three cranks, and claws 410 are of a length to accommodate the resultant claw movement through the film. The initial drive is to any one of the three crank shafts 402. In this particular design it is intended to be to the crank shaft specially designated 402a.

FIG. 23 also shows diagrammatically the operation of a film register or pilot pin 420 that is slidable in member 412. A crank-like member 422 is mounted to swing about a shaft 424 carried on plate 404. Its swinging forked end 426 engages a lug on pin 420. It is here diagrammatically shown as swung by a link 426 which at one end connects to an eccentrically set pin 428 on shaft 402a and at the other end connects to an arm 430 carried by the swinging member 422.

It will be understood that in such schematic figures as FIGS. 5 to 11 where the crank shafts are referred to as being rotatable on fixed axes, a mounting plate such as shown at 300 in FIG. 12, for example, and also the film guide plates, may be assumed as incorporated in those schematic views.

In the claims the term "carrier member" may be considered to designate such structures as 100 in FIG. 5, 141 in FIG. 5a, 166 in FIG. 6, 165 in FIG. 7, 166 in FIGS. 8, 11 and 12 to 18, 504 in FIGS. 19 to 22 and 408 in FIG. 23, on which the claw is carried either directly or by means of further mechanism.

I claim:

1. In a kinetograph mechanism that includes a stationary mounting member, a film guide and a claw adapted to intermittently engage the film for film movement, the combination of,
   a carrier member on which the claw is carried,
   and mounting and driving means for said carrier member embodying
   a plurality greater than two of mounting and stabilizing cranks each of the same radial crank throw,
   each of said cranks being rotatable on a crank shaft axis fixed with relation to the mounting member and having crank pins on axes fixed with relation to the carrier member,
   the several crank pin axes being out of a common alinement and the radial crank throws being in parallelism and in the same orientation about their crank shaft axes,
   and driving means directly engaging only one of said cranks for rotatively driving the same, the other cranks being driven synchronously with said one crank by movement of said carrier member.

2. The combination defined in claim 1 and in which the claw is carried by said carrier member by a planetary mechanism including two planetary gears mounted for rotation on said carrier member and on which the claw is carried.

3. The combination defined in claim 2 and in which the planetary mechanism includes
two planetary gears rotatably mounted on the carrier member,
and a gear rigidly carried by one of the cranks and engaging the planetary gears, 4. The combination defined in claim 1 and in which the number of cranks is three.

5. In a kinetograph mechanism that includes a stationary mounting member, a film guide and a claw adapted to intermittently engage the film for film movement, the combination of
a carrier member on which the claw is carried,
and mounting and driving means for said carrier member embodying
a plurality greater than two of mounting and stabilizing cranks each of the same radial crank throw,
each of said cranks being rotatable on a crank shaft axis fixed with relation to the mounting member and having crank pins on axes fixed with relation to the carrier member,
the several crank pin axes being out of a common alinement and the radial crank throws being in parallelism and in the same orientation about their crank shaft axes,
means for rotatively driving at least one of said cranks,
two planetary gears of the same pitch diameter rotatively mounted on the carrier member,
pins carried by the two planetary gears at substantially equal radii from their axes of rotation, said pins carrying the claw,
and a gear of the same pitch diameter as the planetary gears carried rigidly on one of the cranks on the axis of its crank pin and engaging the planetary gears.

6. In a kinetograph mechanism that includes a stationary mounting member, a film guide and a claw adapted to intermittently engage the film for film movement, the combination of
a carrier member on which the claw is carried
and mounting and driving means for said carrier member embodying
a plurality of mounting cranks of the same radial crank throw rotatable on respective parallel crank shaft axes fixed with relation to the mounting member and having crank pins on axes fixed with relation to the carrier member,
means for rotatively driving the cranks at the same speed and with the same orientation about their crank shaft axes,
two planetary gears of the same pitch diameter rotatively mounted on the carrier member,
pins carried by the two planetary gears at substantially equal radii from their axes of rotation, said pins carrying the claw,
and a gear of the same pitch diameter as the planetary gears carried rigidly on one of the cranks on the axis of its crank pin and engaging the planetary gears.

7. In a kinetograph mechanism that includes a stationary mounting member, a film guide and a claw adapted to intermittently engage the film for film movement, the combination of,
a carrier member on which the claw is carried,
crank means including a crank pin and driving the carrier member at the axis of its crank pin in a circular path,
stabilization means stabilizing the carrier member in positions parallel to itself throughout its said movement,
and a differential gear mechanism carried by the carrier member and carrying the claw.

8. The combination defined in claim 7 and in which the crank means and stabilization means include three cranks of equal throw carrying the carrier member on their crank pins.

9. The combination defined in claim 8 and including means directly engaging only one of the cranks for rotatively driving the same.

10. The combination defined in claim 7 and in which the stabilization means comprise
a stabilizing member,
means constraining the stabilizing member to translational movement with respect to the mounting member along a first straight line,
and means constraining the carrier member to translational movement with respect to the stabilizing member along a second straight line non-parallel to the first line.

11. In a kinetograph mechanism that includes a stationary mounting member, a film guide and a claw adapted to intermittently engage the film for film movement, the combination of,
a carrier member,
crank means including a crank pin for driving the carrier member at the axis of the crank pin in a circular path,
stabilization means stabilizing the carrier member in positions parallel to itself throughout its said movement,
and structure mounting the claw on the carrier member for translational movement relative thereto in a circular path in a plane parallel to said circular path of the carrier member and in a direction opposite to the carrier member movement.

12. In a kinetograph mechanism that includes a stationary mounting member, a film guide and a claw adapted to intermittently engage the film for film movement, the combination of
a claw carrying arm,
and mounting and driving means for said arm embodying
two rotary members journaled on the mounting member on mutually parallel drive axes,
means for driving the rotary members at equal angular speed,
structure carried by the rotary members and defining two mutually parallel spaced crank axes that are parallel to the drive axes, said member rotation causing the crank axes to move parallel to themselves along respective circular paths at equal angular speeds,
crank means journaled on the respective crank axes and including crank pivot means,
and means for driving each crank means opposite to said circular axis movement and at an integral multiple of the angular speed thereof,
said claw carrying arm being carried by said crank pivot means.

13. The combination defined in claim 12, and in which said axis defining structure comprises means mounted on the respective rotary members and defining said crank axes at essentially equal radii from the respective drive axes,
and said means for driving the crank means comprise two internally toothed ring gears fixedly mounted with respect to the mounting member coaxially of the respective drive axes and engaging gears mounted on the respective crank means.

14. The combination defined in claim 12, and in which said crank axis defining structure comprises crank pivots mounted on the rotary members and defining said crank axes at equal radii from the respective drive axes, a carrier member pivotally carried by the crank pivots, and means on the carrier member defining said gear axes,
and said means for driving the crank means comprise gear means mounted on at least one of the rotary members in fixed rotational relation thereto and coaxially of the crank pivot, and gears mounted on the respective crank means and continuously engaging said gear means.

15. The combination defined in claim 12, and in which said axis defining structure comprises means mounted on the respective rotary members and defining said crank axes at essentially equal radii from the respective drive axes.

16. The combination defined in claim 15, and in which said means for driving the crank means comprise gears mounted on the respective crank means, and gear means drivingly engaging the gears.

17. In a kinetograph mechanism that includes a stationary mounting member, a film guide and a claw adapted to intermittently engage the film for film movement, the combination of,
   two internally toothed ring gears stationary on the mounting member with parallel axes spaced in a direction perpendicular to the axes,
   two driven gears meshing with the respective ring gears and with pitch diameters equal to an integral submultiple of the ring gear pitch diameters,
   means driving the axes of said two driven gears in a common direction along respective circular paths concentric with the ring gears, with said two driven gears continuously in mesh with the ring gears,
   and crank pins fixedly mounted with respect to said two driven gears at substantially equal radial distances from their axes,
   said crank pins carrying a claw carrying arm.

18. In a kinetograph mechanism that includes a stationary mounting member, a film guide and a claw adapted to intermittently engage the film for film movement, the combination of,
   a claw carrying member,
   and mounting and driving means for said member embodying,
   two equal radial throw cranks with their crank shaft axes in parallelism and spacedly fixed with relation to the mounting member,
   means for driving said cranks in the same direction with their radial throws in the same orientation about the crank shaft axes,
   two links of substantially equal lengths connected each at one end to the crank pins of the cranks,
   the other ends of said links pivotally carrying a claw carrying arm at points spaced substantially equal to the spacing of the crank shaft axes,
   and means guiding one of said spaced pivotal points along a predetermined path.

19. In a kinetograph mechanism that includes a stationary mounting member, a film guide and a claw adapted to intermittently engage the film for movement, the combination of,
   a claw carrying member,
   and mounting and driving means for said member embodying
   two equal radial throw cranks with their crank shaft axes in parallelism and spacedly fixed with relation to the mounting member
   means for driving said cranks in the same direction with their radial throws in the same orientation about the crank shaft axes,
   two links of substantially equal lengths connected each at one end to the crank pins of the cranks,
   the other ends of said links pivotally carrying a claw carrying arm at points spaced substantially equal to the spacing of the crank shaft axes,
   one of said links being extended beyond its said other end,
   and a guiding link pivotally connected at one end to said link extension and having a fixed pivot at its other end.

20. In a kinetograph mechanism that includes a stationary mounting member, a film guide and a claw adapted to intermittently engage the film for film movement, the combination of
   a carrier member, including structure defining two mutually spaced parallel support axes,
   structure mounting the carrier member on the mounting member for relative translational movement parallel to itself along a circular path perpendicular to said support axes,
   arm members pivotally mounted on the carrier member on the respective support axes,
   a claw arm pivotally supported on the arm members on respective pivot axes parallel to each other and to the support axes and mutually spaced by the same distance as the support axes, the film engaging claw being mounted on the claw arm,
   means for driving the carrier member continuously in its said circular translational movement,
   and means for causing the arm members to swing about the support axes relative to the carrier member in substantially identical predetermined patterns of cyclic movement in response to said circular movement of the carrier member.

21. The combination defined in claim 20 and in which the last said means comprise means mounted on said arm members and constraining the same to follow an arcuate path with respect to the mounting member, said pattern of cyclic movement comprising oscillatory movement of the arm members through angles less than 360°.

22. The combination defined in claim 20, and in which the last said means comprise a drive gear rotatably mounted with respect to the carrier member and driven continuously in response to said circular movement of the carrier member,
   two driven gears coaxially with the respective support axes and rotatively fixed with respect to the respective arms and engaging said drive gear, said pattern of cyclic movement comprising continuous rotray movement of the arm members about their respective support axes.

References Cited

UNITED STATES PATENTS

| | | | |
|---|---|---|---|
| 1,631,570 | 6/1927 | Amet | 226—58 |
| 1,784,515 | 12/1930 | Fairall | 226—69 |
| 3,176,526 | 4/1965 | Fischer | 74—86 |

MILTON KAUFMAN, *Primary Examiner.*